US011196042B2

(12) United States Patent
Cho et al.

(10) Patent No.: US 11,196,042 B2
(45) Date of Patent: Dec. 7, 2021

(54) METHOD FOR PREPARING SILICON-BASED ACTIVE MATERIAL PARTICLES FOR SECONDARY BATTERY AND SILICON-BASED ACTIVE MATERIAL PARTICLES

(71) Applicant: Nexeon Ltd, Oxfordshire (GB)

(72) Inventors: Young Tai Cho, Seo-gu Daejeon (KR); Yong Gil Choi, Yuseong-gu Daejeon (KR); Seung Chul Park, Yuseong-gu Daejeon (KR); Seon Park, Dong-gu Daejeon (KR); Hee Young Seo, Yuseong-gu Daejeon (KR); Jee Hye Park, Yuseong-gu Daejeon (KR); Yong Eui Lee, Gyeonggi-do (KR); Chul Hwan Kim, Daejeon (KR)

(*) Notice: Subject to any disclaimer, the term of this patent is extended or adjusted under 35 U.S.C. 154(b) by 245 days.

(21) Appl. No.: 16/439,602

(22) Filed: Jun. 12, 2019

(65) Prior Publication Data
US 2019/0296340 A1 Sep. 26, 2019

Related U.S. Application Data

(63) Continuation of application No. 15/327,744, filed as application No. PCT/KR2015/007575 on Jul. 21, 2015, now Pat. No. 10,522,824.

(30) Foreign Application Priority Data

Jul. 23, 2014 (KR) .................. 10-2014-0093627

(51) Int. Cl.
*H01M 4/36* (2006.01)
*C01B 33/02* (2006.01)
(Continued)

(52) U.S. Cl.
CPC ............. *H01M 4/366* (2013.01); *C01B 33/02* (2013.01); *C01B 33/113* (2013.01); *H01M 4/38* (2013.01);
(Continued)

(58) Field of Classification Search
CPC ........ H01M 4/366; H01M 4/38; H01M 4/386; H01M 4/48; H01M 4/483; H01M 4/62;
(Continued)

(56) References Cited

U.S. PATENT DOCUMENTS 5,658,691 A 8/1997 Suzuki et al.
7,311,999 B2 12/2007 Kawase et al.
(Continued)

FOREIGN PATENT DOCUMENTS

CN 1569623 A 1/2005
CN 1967910 A 5/2007
(Continued)

OTHER PUBLICATIONS

Abel, P. R. et al., Improving the Stability of Nanostructured Silicon Thin Film Lithium-Ion Battery Anodes through Their Controlled Oxidation, ACS Nano, 6(3):2506-2516, (2012).
(Continued)

*Primary Examiner* — Brittany L Raymond
(74) *Attorney, Agent, or Firm* — Choate, Hall & Stewart LLP; William R. Haulbrook; Michael D. Schmitt

(57) ABSTRACT

The present invention relates to a method for preparing silicon-based active material particles for a secondary battery and silicon-based active material particles. The method for preparing silicon-based active material particles according to an embodiment of the present invention comprises the steps of: providing silicon powder; dispersing the silicon powder into an oxidant solvent to provide a mixture prior to grinding; fine-graining the silicon powder by applying
(Continued)

mechanical compression and shear stress to the silicon powder in the mixture prior to grinding to produce silicon particles; producing a layer of chemical oxidation on the fine-grained silicon particles with the oxidant solvent while applying mechanical compression and shear stress to produce silicon-based active material particles; and drying the resulting product comprising the silicon-based active material particles to yield silicon-based active material particles.

14 Claims, 6 Drawing Sheets

(51) Int. Cl.
| | |
|---|---|
| C01B 33/113 | (2006.01) |
| H01M 4/38 | (2006.01) |
| H01M 4/48 | (2010.01) |
| H01M 4/62 | (2006.01) |

(52) U.S. Cl.
CPC ............ *H01M 4/386* (2013.01); *H01M 4/48* (2013.01); *H01M 4/483* (2013.01); *H01M 4/625* (2013.01); *C01P 2004/62* (2013.01); *C01P 2004/64* (2013.01); *C01P 2004/80* (2013.01); *C01P 2006/40* (2013.01)

(58) Field of Classification Search
CPC ... H01M 4/625; H01M 10/0525; C01B 33/02; C01B 33/113; C01P 2004/62; C01P 2004/64; C01P 2004/80; C01P 2006/40; Y02E 60/10
See application file for complete search history.

(56) References Cited

U.S. PATENT DOCUMENTS

| | | | |
|---|---|---|---|
| 7,638,239 B2 | 12/2009 | Sato et al. | |
| 8,080,337 B2 | 12/2011 | Higuchi et al. | |
| 8,526,166 B2 | 9/2013 | Choi et al. | |
| 8,772,174 B2 | 7/2014 | Green et al. | |
| 8,940,437 B2 | 1/2015 | Green et al. | |
| 8,945,431 B2 | 2/2015 | Schulz et al. | |
| 9,548,489 B2 | 1/2017 | Abdelsalam et al. | |
| 10,008,716 B2 | 6/2018 | Abdelsalam et al. | |
| 10,077,506 B2 | 9/2018 | Friend et al. | |
| 10,090,513 B2 | 10/2018 | Canham et al. | |
| 10,103,379 B2 | 10/2018 | Macklin et al. | |
| 10,522,824 B2 | 12/2019 | Cho et al. | |
| 10,673,072 B2 | 6/2020 | Cho et al. | |
| 10,693,134 B2 | 6/2020 | Cho et al. | |
| 10,797,303 B2 | 10/2020 | Cho et al. | |
| 10,797,312 B2 | 10/2020 | Cho et al. | |
| 10,822,713 B2 | 11/2020 | Friend et al. | |
| 2003/0054250 A1 | 3/2003 | Kweon et al. | |
| 2003/0215711 A1 | 11/2003 | Aramata et al. | |
| 2004/0062990 A1 | 4/2004 | Shimamura et al. | |
| 2004/0185341 A1 | 9/2004 | Yamamoto et al. | |
| 2004/0214085 A1 | 10/2004 | Sheem et al. | |
| 2005/0031958 A1 | 2/2005 | Fukuoka et al. | |
| 2005/0233213 A1 | 10/2005 | Lee et al. | |
| 2006/0040182 A1 | 2/2006 | Kawakami et al. | |
| 2006/0166098 A1 | 7/2006 | Tabuchi et al. | |
| 2007/0105017 A1 | 5/2007 | Kawase et al. | |
| 2007/0122708 A1 | 5/2007 | Shimamura et al. | |
| 2008/0090152 A1 | 4/2008 | Kosuzu et al. | |
| 2008/0113269 A1 | 5/2008 | Yamamoto et al. | |
| 2008/0145752 A1 | 6/2008 | Hirose et al. | |
| 2009/0162750 A1 | 6/2009 | Kawakami et al. | |
| 2009/0246628 A1 | 10/2009 | Adachi et al. | |
| 2010/0143773 A1 | 6/2010 | Honbou | |
| 2010/0190061 A1 | 7/2010 | Green | |
| 2010/0196760 A1 | 8/2010 | Green | |
| 2010/0209328 A1 | 8/2010 | Bi et al. | |
| 2010/0288970 A1 | 11/2010 | Watanabe et al. | |
| 2011/0001097 A1 | 1/2011 | Aramata et al. | |
| 2011/0163274 A1 | 7/2011 | Plee et al. | |
| 2011/0256452 A1 | 10/2011 | Cho et al. | |
| 2011/0269019 A1 | 11/2011 | Green et al. | |
| 2011/0281180 A1 | 11/2011 | Kim et al. | |
| 2011/0287317 A1 | 11/2011 | Nakanishi | |
| 2011/0311873 A1 | 12/2011 | Schulz et al. | |
| 2013/0004846 A1* | 1/2013 | Kim ................. | H01M 4/364 429/213 |
| 2013/0040199 A1 | 2/2013 | Yamamura | |
| 2013/0071750 A1 | 3/2013 | Park et al. | |
| 2013/0115517 A1 | 5/2013 | Kim et al. | |
| 2013/0157127 A1 | 6/2013 | Hirose et al. | |
| 2013/0216907 A1 | 8/2013 | Rayner et al. | |
| 2013/0266865 A1 | 10/2013 | Kwon et al. | |
| 2013/0337314 A1 | 12/2013 | Essaki et al. | |
| 2014/0021415 A1 | 1/2014 | Kang et al. | |
| 2014/0050987 A1 | 2/2014 | Park et al. | |
| 2014/0106230 A1 | 4/2014 | Kim et al. | |
| 2014/0147751 A1 | 5/2014 | Yang et al. | |
| 2014/0162131 A1 | 6/2014 | Friend et al. | |
| 2014/0170303 A1 | 6/2014 | Rayner et al. | |
| 2014/0246398 A1 | 9/2014 | Zaghib et al. | |
| 2014/0302396 A1 | 10/2014 | Lu et al. | |
| 2014/0349183 A1 | 11/2014 | Macklin et al. | |
| 2014/0349187 A1 | 11/2014 | Hirose et al. | |
| 2015/0044571 A1 | 2/2015 | Abdelsalam et al. | |
| 2015/0104705 A1 | 4/2015 | Canham et al. | |
| 2015/0221936 A1 | 8/2015 | Huang | |
| 2015/0280221 A1 | 10/2015 | Abdelsalam et al. | |
| 2015/0380735 A1* | 12/2015 | Tuduki ................. | H01M 4/366 429/218.1 |
| 2016/0126538 A1* | 5/2016 | Hanelt ............. | H01M 10/0525 429/213 |
| 2016/0172670 A1 | 6/2016 | Friend | |
| 2016/0308205 A1 | 10/2016 | Canham et al. | |
| 2017/0033357 A1 | 2/2017 | Cho et al. | |
| 2017/0047580 A1 | 2/2017 | Cho et al. | |
| 2017/0133674 A1 | 5/2017 | Murphy et al. | |
| 2017/0200939 A1 | 7/2017 | Murphy et al. | |
| 2017/0346079 A1 | 11/2017 | Friend et al. | |
| 2017/0352883 A1 | 12/2017 | Cho et al. | |
| 2018/0034056 A1 | 2/2018 | Cho et al. | |
| 2018/0069234 A1 | 3/2018 | Friend et al. | |
| 2018/0083263 A1 | 3/2018 | Cho et al. | |
| 2019/0190020 A1 | 6/2019 | Park et al. | |
| 2019/0198869 A1 | 6/2019 | Park et al. | |

FOREIGN PATENT DOCUMENTS

| | | |
|---|---|---|
| CN | 101188281 A | 5/2008 |
| CN | 101335342 A | 12/2008 |
| CN | 101442124 A | 5/2009 |
| CN | 102157731 A | 8/2011 |
| CN | 104103807 A | 10/2014 |
| EP | 1054462 A1 | 11/2000 |
| EP | 1396894 A2 | 3/2004 |
| EP | 2533331 B1 | 8/2015 |
| EP | 2966037 A1 | 1/2016 |
| EP | 3093910 A1 | 11/2016 |
| GB | 2464158 A | 4/2010 |
| GB | 2470056 A | 11/2010 |
| GB | 2483372 A | 3/2012 |
| GB | 2495951 A | 5/2013 |
| JP | 06-325765 A | 11/1994 |
| JP | 11-250896 | 9/1999 |
| JP | 2003-100296 A | 4/2003 |
| JP | 2003-303586 A | 10/2003 |
| JP | 2004-303593 A | 10/2004 |
| JP | 2004-311429 A | 11/2004 |
| JP | 2005-259697 A | 9/2005 |
| JP | 03714665 B2 | 11/2005 |
| JP | 2006-100244 A | 4/2006 |
| JP | 2006-269216 A | 10/2006 |
| JP | 2007-128766 A | 5/2007 |
| JP | 2007-294423 A | 11/2007 |
| JP | 2008-004460 A | 1/2008 |
| JP | 4171904 B2 | 10/2008 |

(56) References Cited

FOREIGN PATENT DOCUMENTS

| | | |
|---|---|---|
| JP | 2010-021100 A | 1/2010 |
| JP | 2010-218848 A | 9/2010 |
| JP | 2011-142021 A | 7/2011 |
| JP | 2012-009457 A | 1/2012 |
| JP | 2012084522 A | 4/2012 |
| JP | 2012-178269 A | 9/2012 |
| JP | 2013-131324 A | 7/2013 |
| JP | 2013-131325 A | 7/2013 |
| JP | 2014/082118 A | 5/2014 |
| KR | 2003-0028241 A | 4/2003 |
| KR | 2011-0116585 A | 10/2011 |
| KR | 2012-0089512 A | 8/2012 |
| KR | 2012-0093756 A | 8/2012 |
| KR | 10-1204192 B1 | 11/2012 |
| KR | 2012-0120034 A | 11/2012 |
| KR | 2013-0031778 A | 3/2013 |
| KR | 2013-0050704 A | 5/2013 |
| KR | 2013-0114007 A | 10/2013 |
| KR | 10-1341951 B1 | 12/2013 |
| KR | 2013-0139554 A | 12/2013 |
| KR | 2014-0012351 A | 2/2014 |
| KR | 2014-0022679 A | 2/2014 |
| KR | 2014-0100514 A | 8/2014 |
| KR | 10-1441447 B1 | 9/2014 |
| KR | 2015-0117316 A | 10/2015 |
| KR | 2016-0009658 A | 1/2016 |
| WO | WO-2004/049473 A2 | 6/2004 |
| WO | WO-2004/086539 A1 | 10/2004 |
| WO | WO-2008/044683 A1 | 4/2008 |
| WO | WO-2009/010758 A2 | 1/2009 |
| WO | WO-2009/010759 A1 | 1/2009 |
| WO | WO-2010/128310 A1 | 11/2010 |
| WO | WO-2010/130975 A1 | 11/2010 |
| WO | WO-2010/130976 A1 | 11/2010 |
| WO | WO-2010/139987 A2 | 12/2010 |
| WO | WO-2012/028857 A1 | 3/2012 |
| WO | WO-2012/028858 A1 | 3/2012 |
| WO | WO-2012/175998 A1 | 12/2012 |
| WO | WO-2013/024305 A2 | 2/2013 |
| WO | WO-2013/049939 A1 | 4/2013 |
| WO | WO-2013/114094 A1 | 8/2013 |
| WO | WO-2013/128201 A2 | 9/2013 |
| WO | WO-2013/140177 A2 | 9/2013 |
| WO | WO-2013/146658 A1 | 10/2013 |
| WO | WO-2013/179068 A2 | 12/2013 |
| WO | WO-2014/068318 A1 | 5/2014 |
| WO | WO 2014-202529 * | 12/2014 |
| WO | WO-2014/202529 A1 | 12/2014 |
| WO | WO 2015-003996 * | 1/2015 |
| WO | WO-2015/003996 A1 | 1/2015 |
| WO | WO-2015/082920 A1 | 6/2015 |
| WO | WO-2015/157358 A1 | 10/2015 |
| WO | WO-2016/102098 A1 | 6/2016 |
| WO | WO-2016/102208 A1 | 6/2016 |
| WO | WO-2016/174023 A1 | 11/2016 |

OTHER PUBLICATIONS

Bang, B.M. et al., Scalable Approach to Multi-Dimensional Bulk Si Anodes via Metal-Assisted Chemical Etching, Energy & Environmental Science, 4:5013-5019 (2011).
Chartier, C. et al., Metal-assisted chemical etching of silicon in HF—H2O2, Electrochimica Acta, 53(17):5509-5516 (2008).
Chen et al., Mesoporous Silicon Anodes Prepared by Magnesiothermic Reduction for Lithium Ion Batteries, Journal of the Electrochemical Society, 158(9):A1055-A1059 (2011).
Graetz, J. et al., Highly reversible lithium storage in nanostructured silicon, Journal of the Electrochemical Society, 6(9):194-197 (2003).
Hatchard, T. D. and Dahn, J. R., In Situ XRD and Electrochemical Study of the Reaction of Lithium with Amorphous Silicon, Journal of The Electrochemical Society, 151(6):A838-A842 (2004).
Huang, Z. et al., Metal-Assisted Chemical Etching of Silicon: A Review, Adv. Mater. 23:285-308 (2011).
International Search Report, PCT/KR2015/007575, 4 pages, dated Aug. 13, 2015.
Jia et al., Novel Three-Dimensional Mesoporous Silicon for High Power Litium-Ion Battery Anode Material, Advs. Energy Mater., 1:1036-1039 (2011).
Jia et al., Supporting Information for Advs. Energy Mater., DOI: 10.1002/aenm.201100485: Novel Three-Dimensional Mesoporous Silicon for High Power Litium-Ion Battery Anode Material, Advanced Energy Materials, DOI: 10.1002/aenm.201100485, 4 pages, (2011).
Jung, S. C. et al., Anisotropic Volume Expansion of Crystalline Silicon during Electrochemical Lithium Insertion: An Atomic Level Rationale, Nano Letters, 12:5342-5347, (2012).
Morales, Alfredo M. and Lieber, Charles M., A Laser Ablation Method for the Synthesis of Crystalline Semiconductor Nanowires, Science, 279(9):208-211 (1998).
Ohara, S. et al., A thin film silicon anode for Li-ion batteries having a very large specific capacity and long cycle life, Journal of Power Sources, (136):303-306 (2004).
Oudenhoven, Jos F. M. et al., All-solid-State Lithium-Ion Microbatteries: A Review of Various Three-Dimensional Concepts, Adv. Energy Mater. 1:10-33 (2011).
Ren, W. et al., Preparation of porous silicon/carbon microspheres as high performance anode materials for lithium ion batteries, Journal of Materials Chemistry A: Materials for Energy and Sustainability, 3(11):5859-5865 (2015).
Richman et al., Ordered Mesoporous Silicon through Magensium Reduction of Polymer Templated Silica Thin Films, Nano Lett., 8(9):3075-3079 (2008).
Robinson, D. and Walsh, F.C., The Performance of a 500 Amp Rotating Cylinder Electrode Reactor. Part 1: Current-Potential Data and Single Pass Studies, Hydrometallurgy, 26:93 (1991).
Shin, H. C. et al., Nanoporous Structures Prepared by an Electrochemical Deposition Process, Advanced Materials, 15:19, 1610-1614 (2003).
Stoemenos, J. et al., Silicon on Insulator Obtained by High Dose Oxygen Implantation, Microstructure, and Formation Mechanism, J. Electrochem. Soc., 142(4):1248-1260, (1995).
Winter, M. et al., Insertion Electrode Materials for Rechargeable Lithium Batteries, Adv. Mater. 10(10):725-763 (1988).
Winter, Martin and Brodd, Ralph J., Batteries versus Fuel Cells versus Electrochemical Capacitors, Chern. Rev. 104:4245-4269 (2004).
Written Opinion, PCT/KR2015/007575, 6 pages, dated Aug. 13, 2015.
Xiao, et al., Stabilization of Silicon Anode for Li-ion Batteries, Journal of the Electrochemical Society, 157(10):1047-1051 (2010).
Xu, R. et al., Comparison of sizing small particles using different technologies, Powder Technology, 132:145-153, (2003).
Yang, J. et al., Si/c composites for high capacity lithium storage materials, Journal of the Electrochemical Society, 6(8):154-156 (2003).
Yu et al., Reversible Storage of Lithium in Silver-Coated Three-Dimensional Macroporous Silicon, Adv. Mater., 22:2247-2250 (2010).
Zhang, Sheng Shui, A review on electrolyte additives for lithium-ion batteries, Journal of Power Sources, 162:1379-1394 (2006).
Gaffet, E. and Harmelin, M., Crystal-Amorphous phase transition induced by ball-milling in silicon, Journal of the less-common metals, 157:201-222,(1990).

* cited by examiner

Step A

Step B

Step C

METHOD FOR PREPARING SILICON-BASED ACTIVE MATERIAL PARTICLES FOR SECONDARY BATTERY AND SILICON-BASED ACTIVE MATERIAL PARTICLES

This application is a continuation of U.S. patent application Ser. No. 15/327,744, filed on Jan. 20, 2017, which is a U.S. National Stage Entry of PCT/KR2015/007575, filed Jul. 21, 2015, which claims priority to Korean Patent Application No. 10-2014-0093627, filed on Jul. 23, 2014, the disclosure of each of which are hereby incorporated by reference herein in their entirety.

TECHNICAL FIELD

The present invention relates to a secondary battery technique, and more particularly, to a method of preparing silicon-based active material particles and a silicon-based active material based on the same.

BACKGROUND ART

A secondary battery is a battery capable of being charged and discharged by using an electrode material having excellent reversibility, and one of most popular commercialized examples is a lithium secondary battery. The lithium secondary battery may be used not only as a small power source for small IT devices, such as a smart phone, a portable computer, and an electronic paper, but is also expected to be applied as a medium/large power source mounted on a means of transportation, such as an automobile, or used in a power storage of a power supply network, such as a smart grid.

When a lithium metal is used as a negative electrode material of a lithium secondary battery, short-circuit of the battery may occur due to formation of a dendrite or there is a risk of explosion. Therefore, instead of the lithium metal, crystalline carbon, such as graphite and artificial graphite, soft carbon, hard carbon, and carbon-based active materials to which lithium may be intercalated and deintercalated, are widely used. However, as application of secondary battery expands, there is a demand for higher capacity and higher output of a secondary battery. Accordingly, non-carbon negative electrode materials, which exhibits a capacity of 500 mAh/g or higher and may be alloyed with lithium, (e.g., silicon (Si), tin (Sn), or aluminum (Al)) are spotlighted as replacements of carbon-based negative electrode materials.

From among the above-stated non-carbon negative electrode materials, silicon has the largest theoretical capacity of about 4,200 mAh/g, and thus it is very important to commercialization of silicon in terms of capacity. However, since the volume of silicon increases by four times during charging, an electrical connection between active materials and an electrical connection between a current collector and the active material may be destroyed due to the volume change during charging and discharging, and an irreversible reaction, such as formation of a solid electrolyte interface (SEI) layer (e.g., $Li_2O$) due to corrosion of the active material based on an electrolyte, may occur. As a result, service life of silicon-based negative electrode is deteriorated, and the life deterioration is the major obstacle for commercialization.

While many methods have been proposed in order to achieve a relatively high capacity cell with minimized volume expansion and contraction of an active material to improve its service life, the most likely method for commercialization is to make silicon particles to nano particles. However, although the silicon particles have nano size, even nano-sized silicon particles were not sufficient for commercialization because of the refinement of particles due to repeated volume expansion/shrinkage and a rapid deterioration of service life due to the same. Therefore, for commercialization of silicon-based materials, it is required to design particles capable of maximizing the capacity of a cell while suppressing volume change during charging/discharging, and a manufacturing technique thereof is demanded.

DISCLOSURE OF THE INVENTION

Technical Problem

The present invention provides a method for preparing silicon-based active material particles having a long service life by improving energy density by enhancing irreversible capacity and reducing change of volume associated with charging/discharging, by employing a silicon-based material.

The present invention also provides silicon-based active material particles having the above-described advantages.

Technical Solution

According to an aspect of the present invention, there is provided a method of preparing silicon-based active material particles, the method including providing silicon powders; preparing a pre-pulverization mixture by dispersing the silicon powders in an oxidant solvent; forming silicon particles by refining the silicon powders of the pre-pulverization mixture by applying mechanical compression and shearing stress to the silicon powders; forming silicon-based active material particles by forming a chemical oxidation layer on the refined silicon particles by using the oxidant solvent; and yielding the silicon-based active material particles by drying a result product including the silicon-based active material particles.

The oxidant solvent may include water, de-ionized water, an alcoholic solvent or a mixture of two or more thereof. The alcoholic solvent may include any one of ethyl alcohol, methyl alcohol, glycerol, propylene glycol, isopropyl alcohol, isobutyl alcohol, polyvinyl alcohol, cyclohexanol, octyl alcohol, decanol, hexatecanol, ethylene glycol, 1,2-octane diol, 1,2-dodecane diol, and 1,2-hexadecane diol, or a mixture thereof. Preferably, the alcoholic solvent is ethyl alcohol.

The applying of the mechanical compression and shearing stress is performed in a mill-pulverizing operation using a mixture of abrasive particles and the oxidant solvent. Furthermore, the applying of the mechanical compression and shearing stresses may be achieved by a grinding technique for providing the pre-pulverization mixture between a spinning abrasive plate and a fixed plate and performing pressing and polishing simultaneously.

The circularity of the silicon-based active material particles is equal to or greater than 0.5 and less than or equal to 0.9, and the circularity is determined according to Equation 1 below:

$$\text{Circularity} = \frac{2\sqrt{\pi A}}{P} \qquad \text{[Equation 1]}$$

(A denotes an area of projection of a 2-dimensionally projected silicon particle and P denotes the circumferential length of the 2-dimensionally projected silicon particle).

The core of the silicon particle may have a solid-type shape, a fiber-type shape, or a tube-type shape. The area of the {110} surface of the core of the silicon particle may be greater than the area of the {100} surface and the area of the {111} surface. The {110} surface of the core of the silicon particle may be a pulverized surface of a polished surface.

According to an aspect of the present invention, there is provided a silicon-based active material particle including the core of a silicon particle; and a chemical oxidation layer formed on the core of the silicon particle, wherein the circularity of the silicon-based active material particles is equal to or greater than 0.5 and less than or equal to 0.9, and the circularity is determined according to Equation I above.

According to an aspect of the present invention, there is provided a silicon-based active material particle including the core of a silicon particle; and a chemical oxidation layer formed on the core of the silicon particle, wherein oxygen content of the silicon-based active material particles with respect to the total weight of the silicon-based active material particles is limited to from 9 wt % to 20 wt %.

According to an embodiment of the present invention, there may be provided a method of preparing silicon-based active material particles by refining silicon powders by applying mechanical compression and shearing stresses and, simultaneously, wet-forming a silicon oxide film (hereinafter referred to as a chemical oxidation layer) on the cores of silicon particles by using an oxidant solvent or controlling oxygen contents of the silicon particles. Therefore, this method prevents excessive expansion of the cores of the silicon particles during charging/discharging of a cell, and refinement due to the expansion, and contributes to increased service life of the silicon-based active material particles by causing stable formation of a solid electrolyte interface (SEI).

Furthermore, the silicon-based active material particles prepared according to the embodiment of present invention prevents or minimized tensile hoop stress on surfaces of silicon-based active material particles during lithiation and have circularity for preventing surface cracks of the silicon particles by eliminating remaining stress, although general silicon-based active material particles have very low strength against elongation stress compared to compression stress as well as the chemical silicon oxide. As a result, the silicon-based active material particles exhibit long service life.

MODE FOR CARRYING OUT THE INVENTION

Figure 1A:
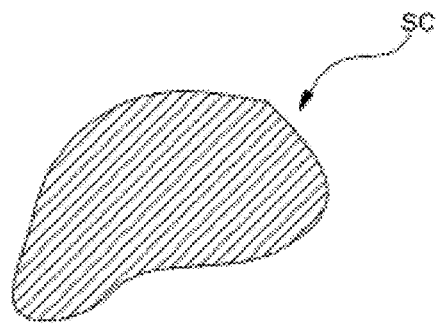
FIGS. 1A and 1B are cross-sectional diagrams showing various shapes of grain-refined silicon particles SC according to various embodiments of the present invention.

Hereinafter, exemplary embodiments will be described in detail with reference to accompanying drawings.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Also, in the drawings, thickness and size of each layer are exaggerated for convenience and clarity of explanation, and like reference numerals denote like elements in the drawings. As used herein, the term "and/or" includes any and all combinations of any of listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

In silicon-based active material particles, a reaction that lithium ions form a $Li_xSi$ compound through an electrochemical reaction with silicon of the silicon-based active material particles proceeds from surfaces of the silicon-based active material particle. In this case, there is a sharp interface between the interior of the silicon-based active material particles that is not yet reacted (pristine-Si) and the lithium compound ($Li_xSi$) layer on the surface of the particles. As lithiation proceeds, the thickness and the volume of the lithium compound layer gradually increase and, when the silicon is completely consumed and the entire particles are changed to the $Li_xSi$ compound, the electrochemical reaction ends. However, if there is an interface between the lithium compound layer and the silicon interior that is not reacted during the lithiation process before the electrochemical reaction ends, a tensile hoop stress is formed in the lithium compound layer from a moment at which the lithium compound layer surrounds silicon particles therein. Generally, silicon particles exhibit high breaking strength against compression stress, but the tensile hoop stress is a major factor in the surface cracking and destruction of silicon particles.

The inventors of the present invention have found that while a silicon-based active material has very low strength against elongation stress compared to compression stress, a chemical silicon oxide that is formed on or inside the cores of silicon particles simultaneously with a process for subdividing silicon powders by using compression stress and shearing stress may prevent or minimize tensile hoop stress on surfaces of silicon-based active material particles during lithiation and prevent surface cracks of the silicon particles by eliminating remaining stress, thus being very effective for controlling shape of silicon-based active material particles and controlling expansion rate thereof.

Figure 1B:
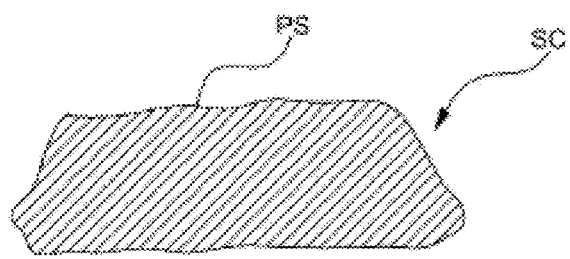
Figure 2A:
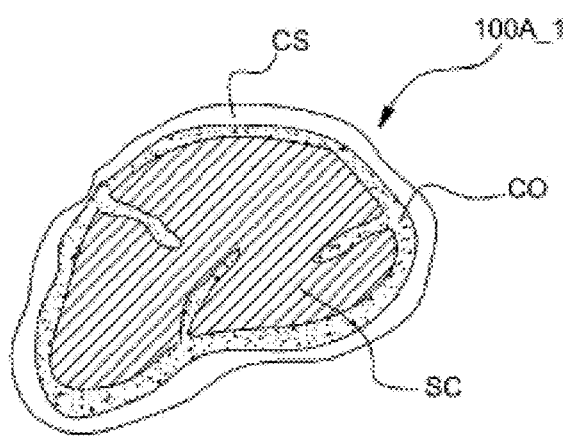
FIGS. 2A and 2B are cross-sectional diagrams showing shapes of active material particles 100A_1 and 100A_2 that are formed as one or more additional layers are formed on the core of silicon particles.
Figure 2B:
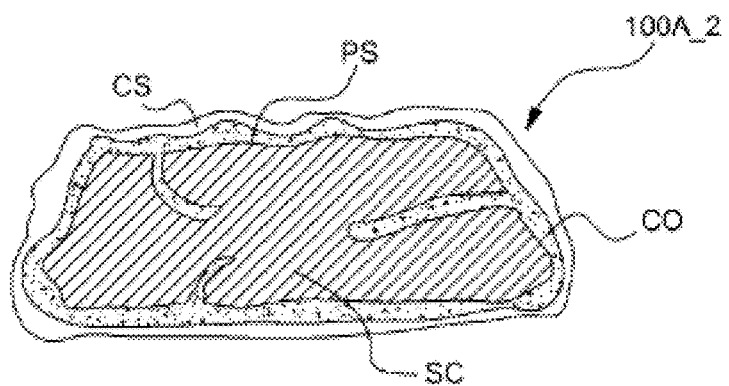

FIGS. 1A and 1B are cross-sectional diagrams showing various shapes of grain-refined silicon particles SC according to various embodiments of the present invention, and FIGS. 2A and 2B are cross-sectional diagrams showing shapes of active material particles 100A_1 and 100A_2 that are formed as one or more additional layers CO and CS are formed on the core of the silicon particles SC.

The grain-refined silicon particles SC have a potato-like shape as shown in FIG. 1A or an irregular flake-like shape having a planar surface PS as shown in FIG. 1B. The silicon particles SC having such an irregular shape are particles refined by mechanical compression and shearing stress applied to the coarse grain silicon powder as prepared by a method described below.

The silicon particles SC refined by mechanical compression and shearing stress may be particles having irregular shapes. Furthermore, the refined silicon particles formed together with a chemical oxide by the shearing stress may have a low crystallinity or may easily become 20 nm or larger amorphous particles without a crystal domain. When the mechanical compression and shearing stresses are too small, it is difficult for the refined silicon particles to become spherical or may have a large crystal domain of 50 nm or larger. Furthermore, when the mechanical compression and shearing stress are too large, the silicon particles become too fine and are unable to obtain sufficient capacity as an active material. Therefore, it is necessary to control the shearing stress during a pulverizing operation.

The grain-type particles shown in FIGS. 1A and 1B in relation to the amorphous silicon grains SC are merely an example. According to another embodiment, the silicon particles of the present invention may be particles having irregular cross-sectional shapes perpendicular to the axial direction in a hollow tube structure or a fiber structure. The planar surfaces PS of the silicon particles SC may be the dominant surfaces of the entire outer surfaces of the silicon particles SC, where the dominant surface may be a {110} surface. Quantitatively, the area of the {110} surface of the silicon particles (SC) may be larger than the area of other {100} surfaces and the area of {111} surfaces.

The silicon-based active material particles 100A_1 and 100A_2 according to an embodiment of the present invention include chemical oxidation layers CO formed on the cores of the silicon particles (SC), as shown in FIGS. 2A and 2B. The chemical oxidation layer CO is a silicon oxide layer formed at low temperatures by a liquid oxidant solvent in the presence of mechanical compression and shearing stress, as described below.

The thickness of the chemical oxidation layer CO is in the range of 2 nm to 30 nm and may be in the range of 3 nm to 15 nm. The chemical oxidation layers CO may be formed on the cores of the silicon particles SC as shown in FIG. 2b, and the chemical oxidation layers CO may also grow inside the cores of the silicon particles SC as the silicon particles SC are cracked by the stresses or oxygen spreads.

In the silicon-based active material particles 100A_1 and 100A_2, oxygen content with respect to the total weight of the cores and the total weight of the chemical oxidation layer CO of the silicon particles SC is in the range of 9 wt % to 20 wt % and may be in the range of 14 wt % to 20 wt %. Both an initial charging rate and the capacity retention characteristic are maintained at 80% or higher within the range of the oxygen content, and thus a silicon-based active material particle suitable for commercialization may be provided. When the oxygen content exceeds 20 wt %, the initial charging rate is reduced by 20% or more. When the oxygen content is 9 wt % or higher, the capacity retention rate becomes 90% or more (refer to Table 2).

The oxygen content is measured by using an infrared detection technique using a commercial element analyzer (ELTRA ONH-2000). Specifically, oxygen in the samples is changed to carbon dioxide by using a sample of 2 mg to 10 mg, a calorie of 8 kW, and helium (purity of 99.995%) as a carrier gas, and an amount of oxygen is quantized by measuring the amount of the carbon dioxide. Therefore, oxygen content may be measured.

The chemical oxidation layer CO may form a stable phase with minimal influence to crystal structures of silicon particles unlike a silicon oxide layer formed by a conventional thermal oxidation process or thin-film deposition process like a chemical vapor deposition process. Generally, in cases of thermal oxidation and chemical vapor deposition, a high processing temperature hinders amorphization of silicon particles. However, since the chemical oxide layer CO is formed at a low temperature and may be formed under high compression and shearing stresses, a silicon oxide layer may be formed with refinement of the silicon particles SC and, selectively, amorphization of the silicon particles SC. As a result, the charging/discharging efficiency of the silicon particles may be improved and service life thereof may be increased. Detailed description thereof will be given below.

The degree of irregularity of shapes of the silicon-based active material particles 100A_1 and 100A_2 is determined based on the shape of the cores SC inside the silicon particles and depends on compression stress and shearing stress in a grain-refining process. An extent to which the shapes of the silicon-based active material particles 100A_1 and 100A_2 deviates from a spherical shape may be evaluated by the circularity as shown in Equation 1. The circularity is determined based on a ratio of an area to which particles are projected to a circumferential length of the particles. In case of a solid type, circularity may be measured by selecting a maximum length of particles and measuring based on an area of projection of the cross-section of a particle including the maximum length. In case of a hollow tube structure or a fiber structure, circularity may be measured based on an area of projection of a cross-section perpendicular to a direction in which a tube or a fiber extends, that is, the longer side direction.

$$\text{Circularity} = \frac{2\sqrt{\pi A}}{P} \qquad \text{[Equation 1]}$$

Here, A denotes an area of projection of a 2-dimensionally projected silicon particle and P denotes the circumferential length of the 2-dimensionally projected silicon particle. The circularity of the silicon particle may be measured from an image obtained via a scanning electron microscope by using commercially available software like ImageJ®, e.g., ImageJ136. Alternatively, the circularity may be measured by using a flow particles image analyzer FPIA-3000® manufactured by SYSMEX (Kobe, Japan).

Circularity of a silicon-based active material particle is equal to or greater than 0.5 and less than or equal to 0.9. Preferably, the circularity is equal to or greater than 0.6 and less than or equal to 0.8. The silicon-based active material particles having circularities less than 0.5 may be subdivided from relatively thin outer portions due to a plurality of number of times of charging and discharging, and thus service life thereof may be deteriorated. On the contrary, when the circularity exceeds 0.9, cracks or fractures easily occur due to tensile stress applied to a lithiation layer as described below. Due to the cracks or fractures, formation of a SEI layer on exposed surfaces of the cores of silicon particles is promoted, thereby deteriorating the service life of a battery.

An average particle size of the silicon-based active material particles 100A_1 and 100A_2 may be in the range of 30 nm to 300 nm and may be in the range of 30 nm to 200 nm. When an average diameter of the silicon-based active material particles 100A_1 and 100A_2 is less than 30 nm, the relative proportion of a conductive layer or a particle-type conductive material in the active material slurry increase, and thus battery capacity decreases. When an average diameter of the silicon-based active material particles 100A_1 and 100A_2 exceeds 300 nm, circularity is increased to minimize surface energy or it becomes difficult to amorphize the silicon-based active material particles 100A_1 and 100A_2.

According to some embodiments, since the chemical oxidation layer CO of the silicon-based active material particles 100A_1 and 100A_2 is electrically insulative, a conductive layer CS may be further formed on the silicon-based active material particles 100A_1 and 100A_2 in order to reduce contact resistance between the silicon-based active material particles 100A_1 and 100A_2 and to secure an electron moving path. The conductive layer CS may include a carbon-based conductive layer, such as a graphite layer, a soft carbon layer, or a graphene layer.

The conductive layer CS is a layer for electrical connection between the silicon-based active material particles contacting one another and reduces the internal resistance to a current collector (not shown). According to some embodiments, the carbon-based conductive layer may be a crystalline layer or at least a partially amorphous carbon film. When the carbon-based conductive layer has a high crystallinity, such as a graphite layer, the carbon-based conductive layer may react with an electrolytic solution. Therefore, a low crystalline or amorphous carbon film having chemical corrosion-resistance is preferable. Furthermore, the carbon-based conductive layer may have a mixture of a conductive graphite structure $SP^2$ and an insulating diamond structure $SP^3$. For the carbon-based conductive layer to have conductivity, the graphite structure $SP^2$ may have a larger mole fraction than the diamond structure $SP^3$, where the conductivities thereof may be controlled via a heat treatment process.

The above-described carbon-based conductive layer is merely an example, and the present invention is not limited thereto. For example, the outermost portions of the silicon-based active material particles 100A_1, 100A_2 may include nanoscale particles of conductive metal oxides, such as antimony zinc oxide or antimony tin oxide, or layers including the same.

Figure 3A:
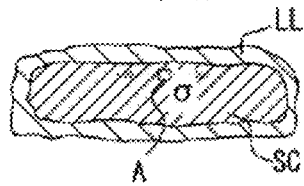
FIGS. 3A through 3C are diagrams showing stages of growth of a lithiated layer occurring when the core of a silicon particle inside a silicon-based active material particle having a dominant flat surface according to an embodiment of the present invention is lithiated during a charging operation.
Figure 3B:
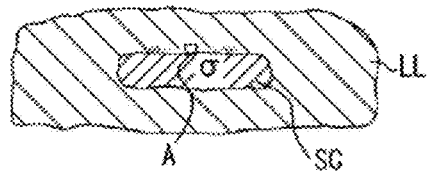
Figure 3C:
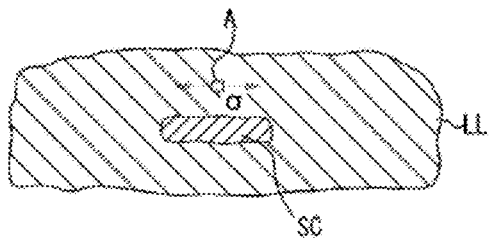
Figure 3D:
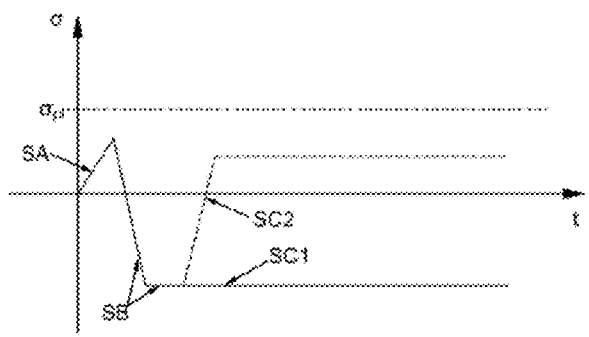
FIG. 3D is a graph showing stress changes at corresponding stage of growth.
Figure 3E:
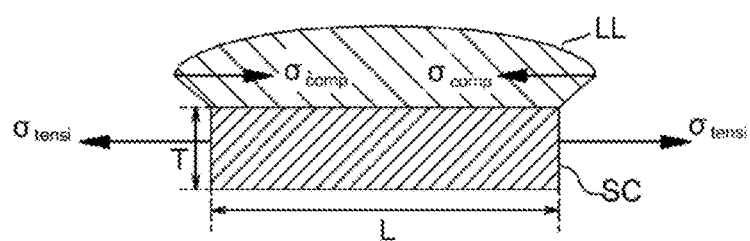
FIG. 3E is a schematic diagram showing a hypothetical stress distribution in order to qualitatively describing the graph of FIG. 3D.

FIGS. 3A through 3C are diagrams showing stages of growth of a lithiated layer occurring when the core of a silicon particle SC having a dominant flat surface inside a silicon-based active material particle according to an embodiment of the present invention is lithiated during a charging operation, FIG. 3D is a graph showing stress changes at corresponding stage of growth, and FIG. 3E is a schematic diagram showing a hypothetical stress distribution in order to qualitatively describing the graph of FIG. 3D. The horizontal axis of the graph indicates charging times at which lithium intercalations occur, whereas the vertical axis of the graph indicates stresses.

Referring to FIGS. 3A through 3C, in the core SC of a silicon particle having a planar surface (refer to PS in FIG. 1B) having a circularity equal to or greater than 0.5 and less than or equal to 0.9 as in an embodiment of the present invention, taking a stage A in which lithiation is initiated on a surface thereof into account, a representative stress element M located in the non-lithiated silicon core SC undergoes small tensile stress due to an expanding lithiated layer LL. When lithiation progresses gradually as in a stage B, compression stress is applied in the representative stress element M, which is located at the front end of lithiation moving toward the core SC of the silicon particle. However, even during a stage C, compression stress is still being applied to the representative stress element M located in the lithiated layer LL, and the corresponding region is still a region where the lithiated layer LL undergoes the elastic behaviour against the compression stress. Therefore, cracks or fractures do not occur in the lithiated layer LL.

Referring to FIG. 3D, the change of the dominant stress in the core SC of the silicon particle in the graph is tensile stress SA in the stage A and becomes compression stress SB in the stage B. In the stage C where the lithiated layer (LL) is dominant, a compression stress SC1 remains or a slight tensile stress SC2 occurs.

Regarding the stage C, referring to FIG. 3E, when a ratio L/T of length L of an area of projection to thickness T thereof is about 4.28 and the core SC of an active material particle having a circularity equal to or greater than 0.5 and less than or equal to 0.9 (in this case, about 0.7) has an interface between the lithiated layer LL formed on a planar surface and a planar surface structure (linear), a compression stress $\sigma_{comp}$ is applied to a surface of a lithiation layer 100L constituting the surface of the silicon particle. Under such a compression stress $\sigma_{comp}$, the lithiated layer LL corresponds to a region undergoing an elastic behaviour, cracks or fractures do not occur in the lithiated layer LL. It is assumed in FIG. 3E that lithium ions Li+ are transferred in one direction. However, even when lithium ions Li+ are transferred to the surfaces of the silicon particles in all directions and the lithium layer LL grows in a shell form, the magnitude of tensile hoop stress applied to the shell by compression stress $\sigma_{comp}$ due to a planar interface based on a controlled circularity may be reduced or eliminated throughout the shell. As a result, cracks on the surface of the lithiated layer (LL) may be suppressed.

Figure 4A:
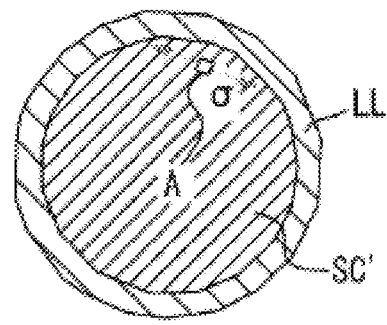
FIGS. 4A through 4C are diagrams showing stages of growth of a lithiated layer as the core of a spherical silicon particle according to a comparative embodiment is lithiated during a charging operation.
Figure 4B:
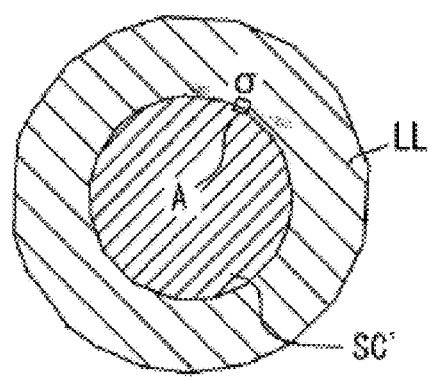
Figure 4C:
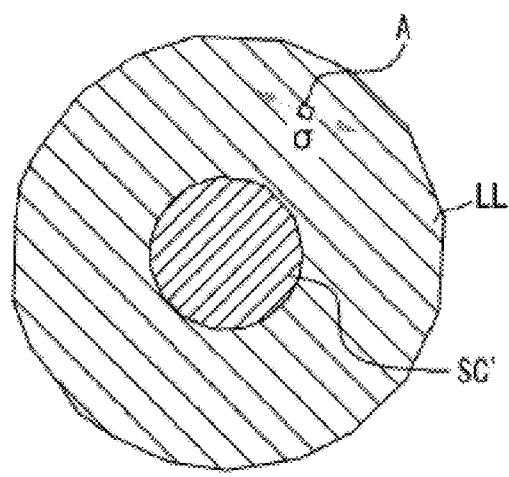
Figure 4D:
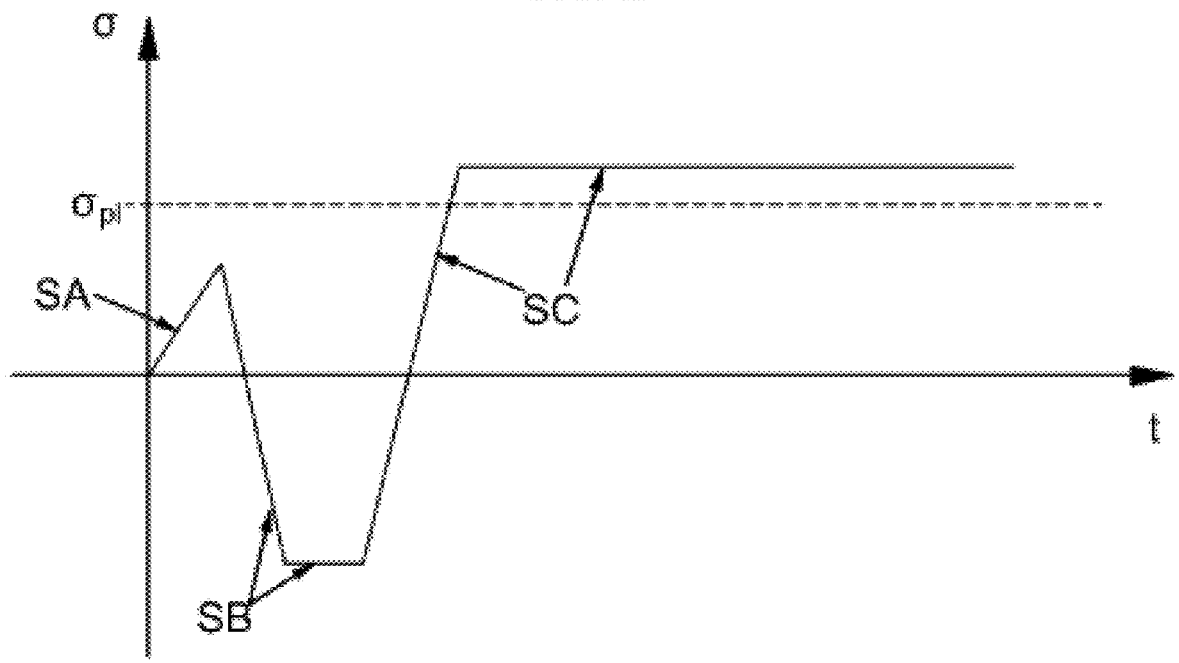
FIG. 4D is a graph showing stress changes at corresponding stages of growth.

FIGS. 4A through 4C are diagrams showing stages of growth of a lithiated layer as the core SC of a spherical silicon particle according to a comparative embodiment is lithiated during a charging operation, and FIG. 4D is a graph showing stress changes at corresponding stages of growth. The horizontal axis of the graph indicates charging times at which lithium incarnations occur, whereas the vertical axis of the graph indicates stresses.

Referring to FIGS. 4A through 4C and FIG. 4D together, in a stage A in which lithiation is initiated on the surface of a silicon particle SC having a circularity of substantially 1 according to the comparative embodiment, the representative stress element M located in the core SC' of a silicon particle which is not yet been lithiated undergoes small tensile stress due to the expanding lithium layer LL like a silicon particle having a circularity according to an embodiment of the present invention. Furthermore, when lithiation gradually proceeds as in a stage B, compression stress is applied in the representative stress element M located at the front end of the lithiated layer LL moving toward the core SC' of the silicon particle. However, in a stage C, as elastic deformation of the representative stress element M located in the lithiated layer LL is gradually disappeared, the lithiated layer LL dominantly grows in a radial shape and tensile hoop stress having a magnitude equal to or greater than a critical tensile stress $\sigma_{plastic}$ is induced. As a result, cracks or fractures occur on the surface of the lithiated layer 100L having a vulnerable construction due to volume expansion based on the tensile hoop stress.

The stress development profile shown in FIG. 4D appears not only in the core SC' of the exemplified substantially spherical silicon particle, but also in a fiber-like or 3-dimensional tube having a symmetrical radial 3-dimensional shape. The above description of the stress change due to lithiation is only for a theoretical basis, and the present invention is not limited by the above theory.

The volume expansion that occurs when the core SC of a silicon particle is lithiated may occur anisotropically. Specifically, volume expansion of silicon in a <1 1 0> direction is dominant during lithiation and volume expansion in a <1 1 1> direction is negligibly small. Although there is no clear theory regarding the phenomenon, it is presumed that a spreading path of lithium is related to a change of morphology based on the elasto-plastic deformation of silicon due to lithiation.

According to these experimental results, volume expansion may occur more significantly in a direction in which lithium spreads rapidly. In a method of minimizing tensile hoop stress in a volume-expanding lithium layer, it is preferable that a dominant flat surface is a {110} surface and, quantitatively, the area of the {110} surface of the core SC of a silicon particle is larger than the area of another {100} surface and the area of a {111} surface.

According to the embodiment of the present invention, by preparing silicon-based active material particles having a reduced circularity equal to or greater than 0.5 and less than or equal to 0.9, an irreversible reaction due to cracks or fractures of cores of silicon particles that occur while a battery is being charged may be suppressed or reduced. Furthermore, as the closer the circularity of the silicon-based active material particles is close to 1, the contacts between the silicon-based active material particles become substantially point-contacts. As a result, electronic conductivity between the silicon-based active material particles is lowered, and thus an output voltage may be reduced due to an increased internal resistance of a battery. However, according to an embodiment of the present invention, surface contacts may occur between the silicon-based active material particles, and thus an increased output of a battery may be expected due to a reduced internal resistance.

Figure 5:
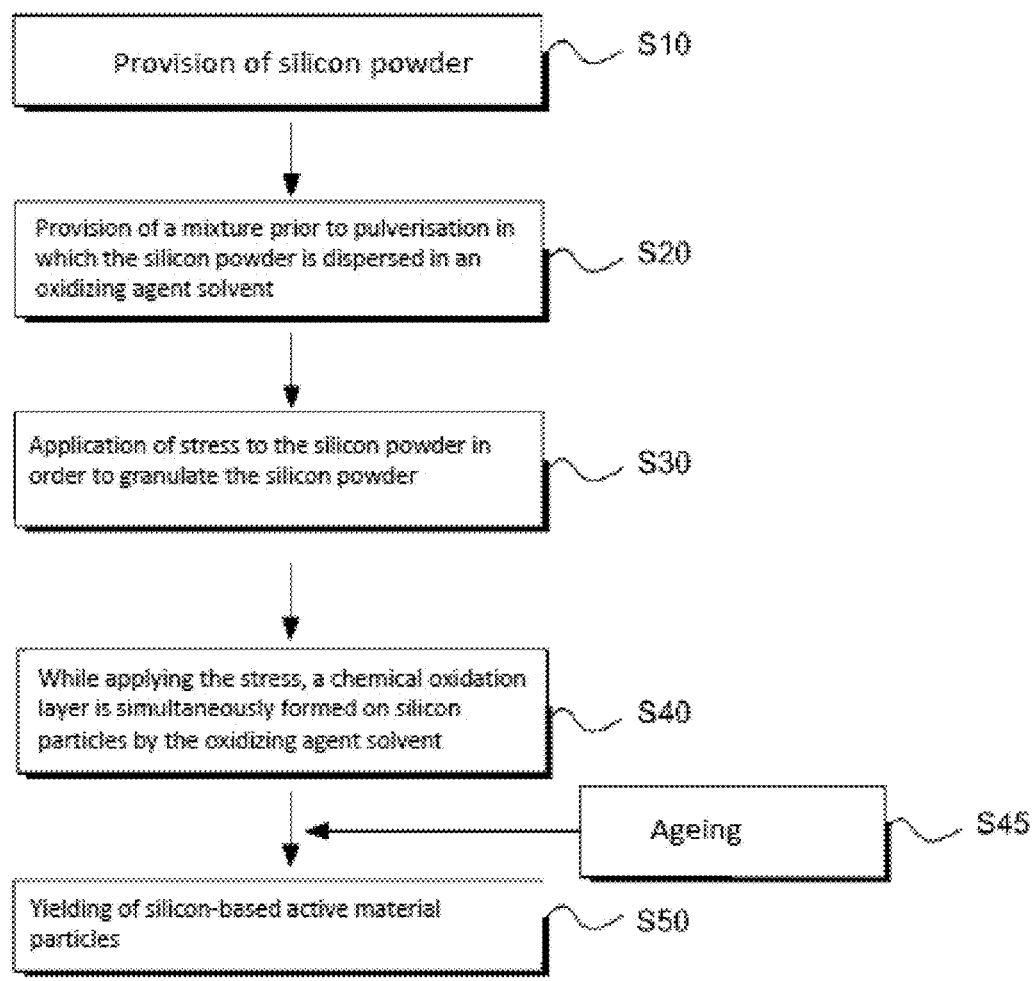
FIG. 5 is a flowchart showing a method of manufacturing silicon-based active material particles according to an embodiment of the present invention.

FIG. 5 is a flowchart showing a method of manufacturing silicon-based active material particles according to an embodiment of the present invention.

Referring to FIG. 5, first, a silicon powder is prepared (operation S10). Silicon powders are commercially available coarse grain particles having an average diameter in the range of a few microns to a few thousand microns. The silicon powder may be polycrystalline or monocrystalline, but the present invention is not limited thereto. A pre-pulverization mixture in which the silicon powder is dispersed in a liquid oxidant solvent is provided (operation S20).

According to an embodiment, the oxidant solvent is for forming a chemical oxidation layer of silicon and may be water, de-ionized water, an alcoholic solvent, or a mixture of two or more thereof. The alcoholic solvent may be any one of ethyl alcohol, methyl alcohol, glycerol, propylene glycol, isopropyl alcohol, isobutyl alcohol, polyvinyl alcohol, cyclohexanol, octyl alcohol, decanol, hexatecanol, ethylene glycol, 1,2-octane diol, 1,2-dodecane diol, and 1,2-hexadecane diol, or a mixture thereof. Preferably, the alcoholic solvent is ethyl alcohol.

The silicon power is grain-refined by applying mechanical compression and shearing stress to the silicon powder of the pre-pulverization mixture, thereby forming silicon particles to become the cores of the silicon-based active material particles (operation S30). Such a grain-refining process is effective for preparing amorphous silicon particles. The circularity of the silicon-based active material particles according to an embodiment of the present invention is equal to or greater than 0.5 and less than or equal to 0.9 and, preferably, the circularity is controlled to be equal to or greater than 0.6 and less than or equal to 0.8.

According to some embodiments, application of mechanical compression and shearing stresses to the silicon powder may be achieved by grinding technique for providing the pre-pulverization mixture between a spinning abrasive plate and a fixed plate and performing pressing and polishing simultaneously. According to another embodiment, application of mechanical compression and shearing stress to the silicon powder may be performed by milling technique for putting the pre-pulverization mixture and abrasive particles in a cylindrical or conic container revolving around a center axis and revolving the container. The abrasive particles may be beads including ceramic particles, metal particles, or mixtures thereof, but the present invention is not limited thereto. The abrasive particles have an appropriate average size for a size of the silicon powder, thereby applying mechanical compression and shearing stress to the silicon powder.

Simultaneously as the mechanical compression and shearing stress are applied, a chemical oxidation layer is formed on the grain-refined silicon particles by using the oxidant solvent, thereby forming silicon-based active material particles (operation S40). The chemical oxidation layer includes a silicon oxide as described above. The thickness of the chemical oxidation layer is in the range of 2 nm to 30 nm and may be in the range of 3 nm to 15 nm.

The silicon-based active material particles (see 100A_1 and 100A_2 in FIG. 2A) have oxygen content from 9 wt % to 20 wt % with respect to the total weight of the core SC and the chemical oxidation layer CO of the silicon particles, where the oxygen content may be in the range of 14 wt % to 20 wt %. Both the initial charging rate and the capacity retention characteristic are maintained at 80% or higher within the oxygen content range, and thus silicon-based active material particles suitable for commercialization may be provided.

Thereafter, a result product including the silicon-based active material particles is dried, and thus silicon composite particles may be yielded (operation S50). Preferably, a subsequent operation, such as a distribution operation for destroying the yielded silicon composite particles, may be further performed.

According to some embodiments, before the operation for drying the result product, an aging operation (operation S45) for reducing stress by additionally oxidizing the silicon-based active material particles by dispersing and stirring the result product in any one of the above-stated oxidant solvents or a mixture thereof may be further performed. Through the aging operation, the residual stress accumulated in the core and/or the chemical oxidation layer of the silicon particles during a refining process using compression stress and shearing stress is alleviated, and the chemical oxidation layer is additionally generated. As a result, the strength of the chemical oxidation layer is increased, and thus the chemical oxide layer may serve as a clamping layer capable of suppressing a volume change of the core of the silicon particles during charging and discharging.

According to some embodiments, as described with reference to FIGS. 2A and 2B, the conductive layer CS may be further formed on the outermost layer of the silicon-based active material particle. For example, a carbon-based conductive layer may be formed by dispersing the silicon-based active material particles in a liquid organic compound including a hydrocarbon-based compound, an alcohol-based compound, an ether-based compound, or an ester-based compound, yielding the same again, and drying and thermally treating the same. These methods are merely examples, and the present invention is not limited thereto. Instead of the carbon-based conductive layer, a conductive layer, such as nanoscale particles of a conductive metal oxide, such as antimony zinc oxide or antimony tin oxide, or a layer of the particles may be applied.

The following experimental examples are selected from the above-described embodiments and do not limit the same.

Experimental Example 1

A commercially available polysilicon powder having an average diameter of about 5 μm was prepared, and the polysilicon powder was dispersed in an oxidant solvent of 100% ethanol to prepare a pre-pulverization mixture. Silicon-based active material particles having circularities of about 0.4, 0.5, 0.6, 0.7, 0.8, and 0.9 were prepared by repeating a mill-pulverizing operation with a controlled time for applying compression and shearing stresses to the pre-pulverization mixture for at least once. According to a comparative embodiment, a spherical silicon-based active material particle having a circularity of 0.95 or higher include a silicon oxide layer formed on a spherical commercial silicon particle by thermal oxidation.

Figure 6:
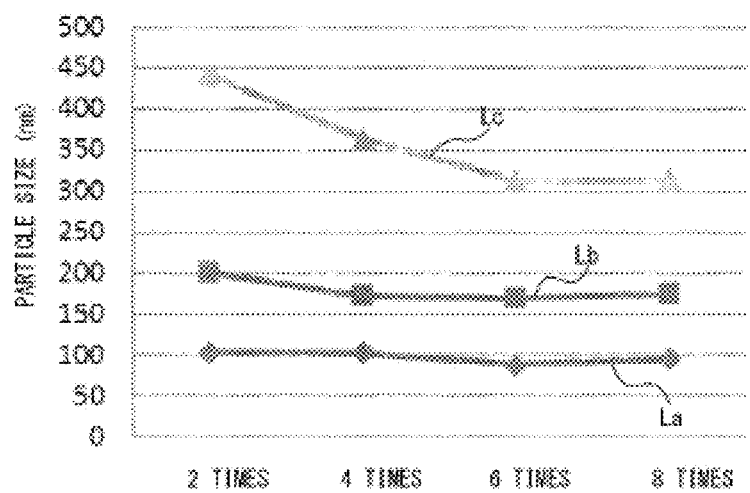
FIG. 6 is a graph showing changes of average particle sizes of respective samples when the mill-pulverizing process is repeated twice, four times, six times, and eight times, respectively.

FIG. 6 is a graph showing changes of average particle sizes of respective samples when the mill-pulverizing process is repeated twice, four times, six times, and eight times, respectively. The curve La indicates the change of the maximum particle size within the range of 10% from the minimum particle size in the entire particle size distribution of the silicon-based active material particles after the mill-pulverizing process. The curve Lb indicates the change of the maximum particle size within the range of 50% from the minimum particle size in the entire particle size distribution of the silicon-based active material particles, that is, an average particle size. The curve Lc indicates the change of the maximum particle size within the range of 90% from the minimum particle size m the entire particle size distribution of the silicon-based active material particles. As the number of times for performing the mill-pulverizing process increases, the particle size distribution is reduced and the particle sizes of 90% of the silicon-based active material particles are reduced to 310 nm or smaller particle sizes. Generally, when a particle size is 200 nm or smaller, the particle size is not affected by the number of times for performing the mill-pulverizing process. An average particle size may be reduced by reducing size of abrasive particles used for mill-pulverization. For example, in case of 0.3 mm balls, an average particle size of about 200 mm may be obtained and, in case of 0.1 mm balls, an average particles size from about 50 to about 60 nm may be obtained.

Figure 7A:
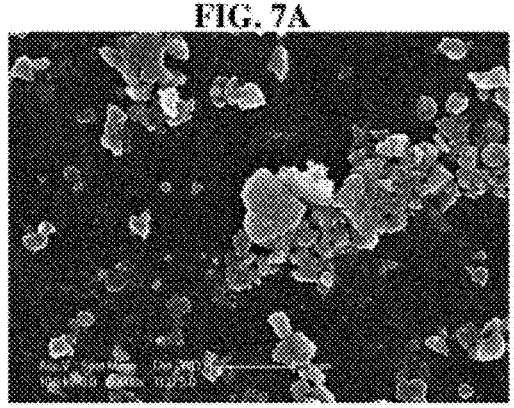
FIGS. 7A and 7B are scanning electron microscopic images obtained when the mill-pulverizing process according to an embodiment of the present invention is repeated twice and eight times, respectively.
Figure 7B:
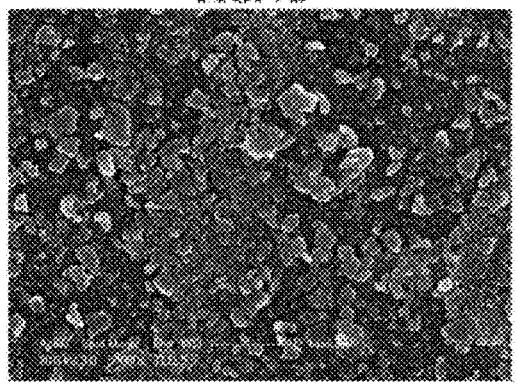

FIGS. 7A and 7B are scanning electron microscopic images obtained when the mill-pulverizing process according to an embodiment of the present invention is repeated twice and eight times, respectively. Referring to FIGS. 7A and 7B, the circularity of the silicon-based active material particles is about 0.8, where there is no significant difference. However, the particle size distribution of the silicon-based active material particles decreases sharply as the number of times for performing mill-pulverization increases.

Figure 8A:
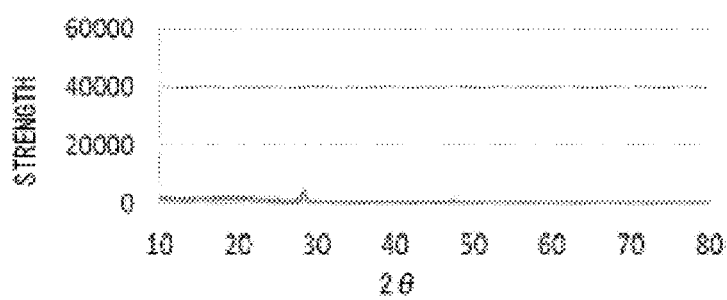
FIG. 8A is an X-ray diffraction image of silicon-based active material particles having an average particles diameter of 200 nm after two mill-pulverizations.
Figure 8B:
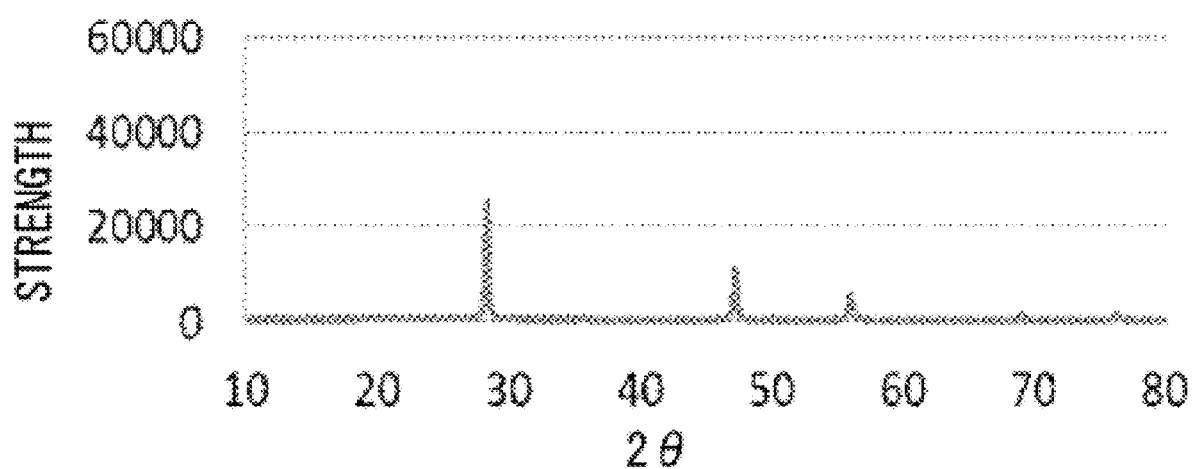
FIG. 8B is an X-ray diffraction graph of a silicon oxide film having a thermally oxidized silicon oxide layer.

FIG. 8A is an X-ray diffraction image of silicon-based active material particles having an average particles diameter of 200 nm after two mill-pulverizations, and FIG. 8B is an X-ray diffraction graph of a silicon oxide film having a thermally oxidized silicon oxide layer. Referring to FIG. 8A, no crystal domain having a size of 50 nm or larger can be found in the core of the silicon particles of the silicon-based active material particles having an average particles diameter of 200 nm, and the peak in the X-ray diffraction graph is also weak. However, referring to FIG. 8B, a Si crystal peak several tens of times stronger as compared to the present invention can be found. Therefore, according to an embodiment of the present invention, it was confirmed that a pulverizing operation for forming silicon particles and an operation for forming a chemical oxide layer are performed simultaneously, thereby forming a stable silicon oxide without causing crystallization of silicon particles during the pulverizing operation.

Table 1 below shows initial efficiencies, capacities per weight, and capacity retentions of half cells evaluated after negative electrodes are fabricated by slurrying the silicon-based active material particles having the respective circularities. Capacity retention is a result evaluated after 50 charging/discharging cycles. The reference initial capacity is 4,200 mAh/g, which is the theoretical capacity of silicon.

TABLE 1

| | Cell Characteristics | | |
|---|---|---|---|
| Circularity | Initial Efficiency | Capacity per Weight | Capacity Retention at 50 Times |
| 0.4 | 81% | 2,040 mAh/g | 73% |
| 0.5 | 84% | 2,110 mAh/g | 85% |
| 0.6 | 88% | 2,290 mAh/g | 93% |
| 0.7 | 89% | 2,320 mAh/g | 98% |
| 0.8 | 90% | 2,341 mAh/g | 98% |

TABLE 1-continued

| | Cell Characteristics | | |
|---|---|---|---|
| Circularity | Initial Efficiency | Capacity per Weight | Capacity Retention at 50 Times |
| 0.9 | 90% | 2,343 mAh/g | 81% |
| 0.95 | 90% | 2,342 mAh/g | 60% |

Referring to Table 1, the initial efficiency tends to gradually decrease as circularity decreases for circularities of 0.8 or less. However, initial efficiencies of 80% or higher, which are practical initial efficiencies, appear at all of circularities of 0.4 or higher. In terms of capacity retention, residual capacity was reduced to less than 80% due to increased irreversibility based on a volume expansion when the circularity was less than 0.5. However, at circularities within the range of 0.5 to 0.9, the residual capacity is maintained at 80% or higher, which is a practical level, and is maintained at 90% or higher at circularities in the range of 0.6 to 0.8.

Experimental Example 2

Similar to the Experimental Example 1, poly-silicon powder having an average diameter of about 5 μm was prepared, and pre-pulverization mixtures were prepared by dispersing the poly-silicon powers in 100% mol of ethanol, a mixed solution of 75% mol of ethanol and 25% mol of water (distilled water), a mixed solution of 50% mol of ethanol and 50% mol of water, a mixed solution of 25% mol of ethanol and 75% mol of water, and 100% mol of water. Each of the pre-pulverization mixtures was subjected to time-controlled mill-pulverizing operation once to control the oxygen content thereof. The average circularity was 0.6. The samples prepared using the various above-stated oxidant solvents according to an embodiment of the present invention are sequentially referred to as samples a0, b0, c0, d0 and e0.

Next, an aging operation for placing these samples in a fresh oxidant solvent of the same kind as that of the oxidant solvent applied to these samples and dispersing and stirring the same for 24 hours and 48 hours was performed. The aged samples were respectively labelled as samples a1, b1, c1, d1, and e1 and samples a2, b2, c2, d2, and e2 and were evaluated for oxygen content changes and cell characteristics. Table 2 shows a result of evaluating the changes of the oxygen content of the samples according to an embodiment of the present invention and the initial efficiencies, capacities per weight, and capacity retentions of fabricated half cells.

TABLE 2

| | | | | Cell Characteristics | | |
|---|---|---|---|---|---|---|
| Sample | Oxidant Solvent (% Mole Concentration) | Aging Time (Hr) | Oxygen Content | Initial Efficiency | Capacity per Weight | Capacity Retention at 50 Times |
| Sample a0 | Ethanol 100% | 0 | 10.1 | 88.0% | 2290 mAh/g | 93.0% |
| Sample b0 | Ethanol 75%:Water 25% | 0 | 11.8 | 88.2% | 2199 mAh/g | 94.0% |
| Sample c0 | Ethanol 50%:Water 50% | 0 | 12.3 | 88.1% | 2170 mAh/g | 94.1% |
| Sample d0 | Ethanol 25%:Water 75% | 0 | 13.7 | 86.3% | 1989 mAh/g | 95.1% |
| Sample e0 | Water 100% | 0 | 18.8 | 82.1% | 1782 mAh/g | 97.8% |
| Sample a1 | Ethanol 100% | 24 | 11.4 | 88.5% | 2187 mAh/g | 94.6% |
| Sample b1 | Ethanol 75%:Water 25% | 24 | 13.1 | 86.4% | 2163 mAh/g | 94.4% |
| Sample c1 | Ethanol 50%:Water 50% | 24 | 13.7 | 86.7% | 2111 mAh/g | 95.9% |
| Sample d1 | Ethanol 25%:Water 75% | 24 | 14.6 | 84.5% | 1932 mAh/g | 96.8% |
| Sample e1 | Water 100% | 24 | 20.8 | 79.5% | 1701 mAh/g | 97.2% |
| Sample a2 | Ethanol 100% | 48 | 13.1 | 87.1% | 2092 mAh/g | 93.4% |
| Sample b2 | Ethanol 75%:Water 25% | 48 | 14.5 | 85.5% | 2007 mAh/g | 93.9% |
| Sample c2 | Ethanol 50%:Water 50% | 48 | 15.7 | 84.1% | 1946 mAh/g | 96.9% |
| Sample d2 | Ethanol 25%:Water 75% | 48 | 17.4 | 82.1% | 1801 mAh/g | 97.2% |
| Sample e2 | Water 100% | 48 | 23.5 | 77.8% | 1603 mAh/g | 98.8% |

Referring to Table 2, water has the highest oxygen content. Furthermore, when the aging operation is performed for 24 hours and 48 hours, oxygen content further increases. The reason thereof is that the silicon-based active material particles are further oxidized through the aging operation. Furthermore, the oxidation during the aging operation eliminates residual stress of the silicon particles accumulated during the process of grain-refinement of the silicon powder, thereby preventing the silicon-based active particles from being rapidly refined due to the residual stress during charging and discharging. As a result, durability of the silicon-based active material particles may be improved. In relation, thereto, in case of an aged sample, although the capacity per weight and the initial efficiency are comparatively lower than an sample not subjected to an aging operation, but the residual capacity of the aged sample is improved. Therefore, it is clear that an aging operation improves service life of a cell employing silicon-based active material particles as a negative electrode active material.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

According to an embodiment of the present invention, there may be provided a method of preparing silicon-based active material particles by refining silicon powders by applying mechanical compression and shearing stresses and, simultaneously, wet-forming a silicon oxide film (hereinafter referred to as a chemical oxidation layer) on the cores of silicon particles by using an oxidant solvent or controlling oxygen contents of the silicon particles, preventing excessive expansion of the cores of the silicon particles during charging/discharging of a cell, preventing refinement due to the expansion, and contributing to increased service life of the silicon-based active material particles by causing stable formation of a solid electrolyte interface (SEI).

The invention claimed is:

1. Silicon-based active material particles, each of the particles comprising:
   a core of a silicon particle, wherein the core has a silicon crystal domain size of less than 50 nm; and
   a chemical oxidation layer formed on the core of the silicon particle,
   wherein the oxygen content of the silicon-based active material particles with respect to the total weight of the silicon-based active material particles is from 9 wt % to 20 wt %, and
   wherein an average particle size of the silicon-based active material particles is in a range of 30 nm to 300 nm.

2. The silicon-based active material particles of claim 1, wherein the average particle size of the silicon-based active material particles is in a range of 30 nm to 200 nm.

3. The silicon-based active material particles of claim 2, wherein a particle size of 90% of the silicon-based active material particles is 310 nm or less.

4. The silicon-based active material particles of claim 1, wherein a conductive layer is further formed on the chemical oxidation layer.

5. The silicon-based active material particles of claim 4, wherein the conductive layer is a carbon-based conductive layer.

6. The silicon-based active material particles of claim 5, wherein the carbon-based conductive layer has a larger mole fraction of $sp^2$ carbon than $sp^3$ carbon.

7. The silicon-based active material particles of claim 5, wherein the carbon-based conductive layer is a graphite layer, a soft carbon layer, a graphene layer, a crystalline carbon layer, or an amorphous carbon layer.

8. The silicon-based active material particles of claim 7, wherein the carbon-based conductive layer has a larger mole fraction of $sp^2$ carbon than $sp^3$ carbon.

9. The silicon-based active material particles of claim 1, wherein a thickness of the chemical oxidation layer is in a range of 2 nm to 30 nm.

10. The silicon-based active material particles of claim 1, wherein a thickness of the chemical oxidation layer is in a range of 3 nm to 15 nm.

11. The silicon-based active material particles of claim 1, wherein the silicon-based active material particles each have a flake-like shape.

12. The silicon-based active material particles of claim 1, wherein the chemical oxidation layer is formed by refining silicon powder by applying mechanical compression and shearing stresses and, simultaneously, wet-forming the chemical oxidation layer on the cores of the silicon particles by using an oxidant solvent.

13. The silicon-based active material particles of claim 1, wherein the oxygen content of the silicon-based active material particles with respect to a total weight of the silicon-based active material particles is from 14 wt % to 20 wt %.

14. The silicon-based active material particles of claim 1, wherein a circularity of the silicon-based active material particles is equal to or greater than 0.5 and less than or equal to 0.9, and the circularity is determined according to the equation:

$$\text{Circularity} = \frac{2\sqrt{\pi A}}{P}$$

wherein A denotes an area of projection of a 2-dimensionally projected particle and P denotes the circumferential length of the 2-dimensionally projected particle.

* * * * *